No. 828,058. PATENTED AUG. 7, 1906.
P. SCHOU.
BEARING FOR REVOLVING SHAFTS.
APPLICATION FILED APR. 11, 1905.

Witnesses.
H. L. Amer.
B. Sommers

Inventor.
Paul Schou,
by Henry Ott, atty.

THE NORRIS PETERS CO., WASHINGTON, D. C.

UNITED STATES PATENT OFFICE.

PAUL SCHOU, OF COPENHAGEN, DENMARK.

BEARING FOR REVOLVING SHAFTS.

No. 828,058.  Specification of Letters Patent.  Patented Aug. 7, 1906.

Application filed April 11, 1905. Serial No. 254,923.

*To all whom it may concern:*

Be it known that I, PAUL SCHOU, civil engineer, a citizen of Denmark, residing at Copenhagen, Denmark, have invented new and useful Improvements in Bearings for Revolving Shafts, of which the following is a specification.

The object of this invention is to provide an elastic bearing for a revolving shaft.

The elastic effect of the bearing is obtained by inserting a ring filled with fluid between the bearing itself and the part of machinery surrounding same. The principal feature of the invention is that the whole surface of the said fluid-ring is arranged to bear against the walls of the said parts even if these move in relation to one another. Consequently the elastic walls of the fluid-ring itself will never at any point be freely exposed and may therefore be made quite thin.

The invention is illustrated on the accompanying drawings, which show various constructional forms of the bearing.

Figure 1:
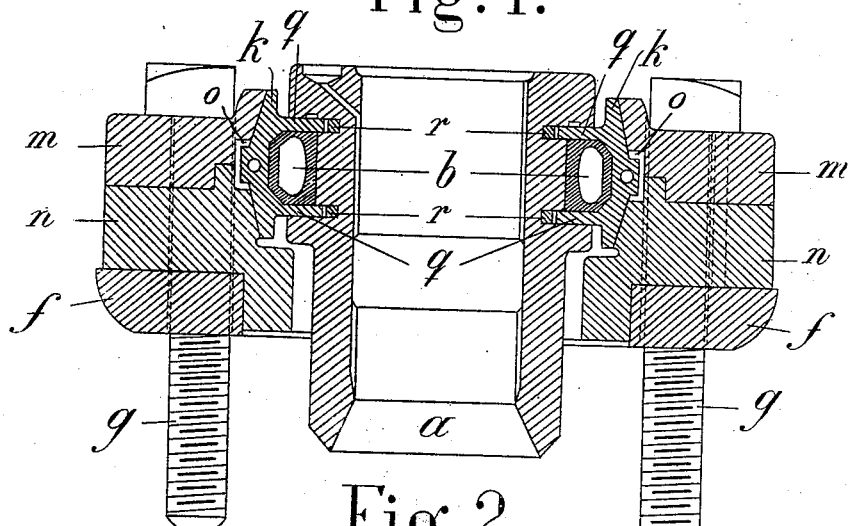
Figure 2:
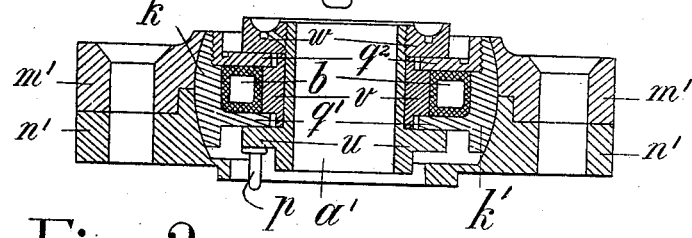
Figure 3:
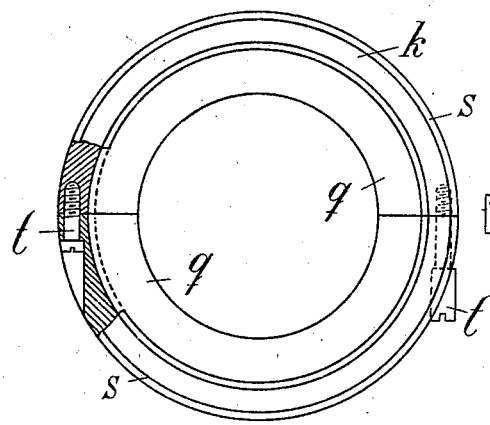
Figure 4:
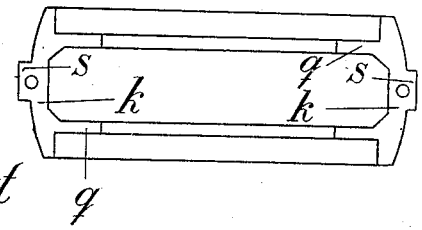

Figures 1 and 2 are vertical sections illustrating various bearings of the said construction. Fig. 3 is a detail plan view, partly in section, of one form of safety-ring; and Fig. 4, an elevation of one-half of the ring.

In the construction shown in Fig. 1 a protecting-ring $k$ is provided with two annular flanges $q$, embracing a flexible fluid-ring $b$, preferably, though not necessarily, made of india-rubber, so that its outer, upper, and lower surfaces bear against the ring $k$, while its inner surface bears against a bearing $a$ for the shaft. (Not shown.) Flanges $q$, formed on the ring $k$, are made to fit into corresponding grooves of the bearing $a$, and between the flanges and the bottom of these grooves are placed rings $r$, of india-rubber or other elastic material. By this arrangement the ring $k$ will act as a safety-ring if the fluid-ring $b$ should burst and the fluid run out while the shaft is turning at full speed. If this should happen, the ring $k$, together with the flanges $q$ and the elastic rings $r$, will temporarily steady the shaft until circumstances permit of the fluid-ring being replaced.

The support for bearing $a$ is here shown as comprising two rings $m$ and $n$, fastened to a ring $f$, and the whole support is fixed to the frame of the machine by means of bolts $g$.

The ring $k$ (shown in detail in Figs. 3 and 4) consists of two semicircular parts each provided with an annular strengthening-rib $s$, the two parts being connected by means of screws $t$. The rings $m$ and $n$ are so shaped as to form a recess $o$, that allows the rib $s$ to move freely when the ring $k$ is assuming an inclined position. One of the screws $t$ has a rather high head, Fig. 3, which by projecting into a cut-away part of the rings $m$ and $n$ serves to prevent the ring $k$ from rotating with the shaft.

In Fig. 2 is shown a safety-ring $k'$ in which it is not necessary to cut the ring radially. A bearing $a'$ is in this case provided at the lower end with a fixed flange $u$ and at its upper end with a screw-thread for receiving a loose flange $w$. When the flange $w$ is unscrewed, the ring $k'$ can be slipped in its place until its lower fixed flange $q'$ rests against the flange $u$ of the bearing. An upper flange $q^2$ of the ring $k'$ is made to unscrew, and on the cylindrical part of the bearing $a'$ is slipped a ring $v$, which is cut away at top and bottom, so as to form, in connection with the flanges $u$ and $w$, grooves for the flanges $q'$ and $q^2$.

In the forms of construction described the bearings $a$ and $a'$ are provided with suitable channels for leading lubricant to the inner surface of the bearing. Suitable means, such as pins $p$, are provided for preventing the bearing $a'$ from rotating with the shaft.

I claim—

1. In a bearing, the combination with a support, of a bearing having grooves formed therein, a protecting member mounted on the support and having flanges projecting into the grooves of the bearing, and a flexible fluid-filled ring mounted between the flanges.

2. In a bearing, the combination with a fixed support, of a bearing having grooves formed in its periphery, a ring mounted on the support and having flanges taking into the grooves, and a flexible fluid-filled ring mounted between said flanges and in contact with the first-mentioned ring and bearing.

3. In a bearing, the combination with a fixed support having a recess formed therein, of a two-piece protecting member having a rib on one face protruding into said recess and parallel flanges on its opposite face, a bearing having grooves formed therein to receive said flanges, a flexible fluid-filled ring mounted between said flanges in contact with the protecting member and bearing, and means to prevent rotation of the protecting member.

In testimony whereof I have signed my name to this specification in the presence of two subscribing witnesses.

PAUL SCHOU.

Witnesses:
 ERNEST BOUTARD,
 P. HOFMAN-BANG.